(12) United States Patent
Zheng et al.

(10) Patent No.: US 8,979,954 B2
(45) Date of Patent: Mar. 17, 2015

(54) HYDROGEN GENERATOR WITH IMPROVED VOLUME EFFICIENCY

(75) Inventors: Guanghong Zheng, Westlake, OH (US); Jason L. Stimits, Avon, OH (US)

(73) Assignee: Intelligent Energy Limited, Loughborough (GB)

( * ) Notice: Subject to any disclaimer, the term of this patent is extended or adjusted under 35 U.S.C. 154(b) by 512 days.

(21) Appl. No.: 13/444,878

(22) Filed: Apr. 12, 2012

(65) Prior Publication Data

US 2012/0269694 A1  Oct. 25, 2012

Related U.S. Application Data

(60) Provisional application No. 61/477,641, filed on Apr. 21, 2011.

(51) Int. Cl.
*B01J 7/00* (2006.01)
*H01M 8/06* (2006.01)
*C01B 3/06* (2006.01)
*H01M 8/04* (2006.01)
*F17C 11/00* (2006.01)

(52) U.S. Cl.
CPC ............ *H01M 8/065* (2013.01); *C01B 3/065* (2013.01); *H01M 8/04216* (2013.01); *C01B 3/06* (2013.01); *F17C 11/005* (2013.01); *Y02E 60/50* (2013.01); *Y02E 60/362* (2013.01); *Y02E 60/321* (2013.01)
USPC .......................................................... 48/61

(58) Field of Classification Search
CPC ... Y02E 60/362; Y02E 60/364; Y02E 60/321; Y02E 60/36; C01B 3/065; C01B 2203/0405; C01B 3/02; C01B 3/06; C01B 3/08; C01B 2203/041; C01B 2203/06; C01B 3/503; H01M 8/065; H01M 8/04208; H01M 8/04216; H01M 8/04201; B01J 7/02
See application file for complete search history.

(56) References Cited

U.S. PATENT DOCUMENTS 4,261,956 A    4/1981   Adlhart
5,262,619 A   11/1993   Karner
(Continued)

FOREIGN PATENT DOCUMENTS

KR    20090034654 A    4/2009
WO    2006134419 A2   12/2006
(Continued)

OTHER PUBLICATIONS

The International Search Report/Written Opinion mailed Nov. 18, 2013 for PCT/US2013/054918.
(Continued)

*Primary Examiner* — Imran Akram
(74) *Attorney, Agent, or Firm* — Baker & Hostetler LLP

(57) ABSTRACT

A hydrogen generator with improved volume efficiency and a method of producing hydrogen gas with the hydrogen generator are disclosed. A fluid containing a reactant is transported from a reactant storage area to a reaction area. Hydrogen gas and an effluent pass from the reaction area into the effluent storage area that is in a volume exchanging relationship with one or both of the reactant storage area and the reaction area. An initially compressed filter is disposed in the effluent storage area to remove solids from the hydrogen gas. The filter is attached to a moveable partition separating the effluent storage area from the reactant storage area and/or the reaction area, and the filter expands as the volume of the effluent storage area increases.

19 Claims, 3 Drawing Sheets

(56) References Cited

U.S. PATENT DOCUMENTS

| | | |
|---|---|---|
| 6,091,050 A | 7/2000 | Carr |
| 6,924,054 B2 | 8/2005 | Prasad et al. |
| 6,924,055 B2 | 8/2005 | Hirsch et al. |
| 6,994,932 B2 | 2/2006 | Kinkelaar et al. |
| 7,105,245 B2 | 9/2006 | Ohlsen et al. |
| 7,291,191 B2 | 11/2007 | Kaye |
| 7,291,410 B2 | 11/2007 | Kinkelaar et al. |
| 7,674,540 B2 | 3/2010 | Adams et al. |
| 8,408,254 B2 | 4/2013 | Shibukawa |
| 2003/0118505 A1* | 6/2003 | Andersen et al. ............. 423/650 |
| 2003/0145726 A1 | 8/2003 | Gueret et al. |
| 2004/0148857 A1 | 8/2004 | Strizki et al. |
| 2005/0074643 A1 | 4/2005 | Adams et al. |
| 2005/0238573 A1 | 10/2005 | Zhang et al. |
| 2006/0174952 A1 | 8/2006 | Curello et al. |
| 2007/0062115 A1* | 3/2007 | Berry et al. ........................ 48/61 |
| 2007/0151983 A1 | 7/2007 | Patel et al. |
| 2008/0014479 A1 | 1/2008 | Fiebig |
| 2008/0014481 A1 | 1/2008 | Fiebig |
| 2008/0026269 A1* | 1/2008 | Shurtleff et al. ................ 429/19 |
| 2008/0216906 A1* | 9/2008 | Curello et al. ........... 137/614.03 |
| 2008/0233462 A1 | 9/2008 | Curello et al. |
| 2009/0017347 A1* | 1/2009 | Damery et al. ................. 429/19 |
| 2009/0104481 A1* | 4/2009 | Mohring et al. ................ 429/17 |
| 2009/0119989 A1 | 5/2009 | Withers-Kirby et al. |
| 2009/0123342 A1* | 5/2009 | Sgroi et al. .................... 422/107 |
| 2010/0104481 A1 | 4/2010 | Curello et al. |
| 2010/0129266 A1* | 5/2010 | Shurtleff et al. .............. 422/119 |
| 2010/0151338 A1 | 6/2010 | Sarata et al. |
| 2010/0151361 A1* | 6/2010 | Adams et al. ................. 429/515 |
| 2010/0247426 A1 | 9/2010 | Wallace et al. |
| 2011/0020215 A1 | 1/2011 | Ryu et al. |
| 2011/0070151 A1* | 3/2011 | Braithwaite et al. ....... 423/648.1 |
| 2011/0159384 A1* | 6/2011 | Giuffrida et al. ............. 429/416 |
| 2011/0194992 A1* | 8/2011 | Barton et al. .................. 422/239 |
| 2012/0100443 A1 | 4/2012 | Braithwaite et al. |
| 2012/0115054 A1* | 5/2012 | Wallace et al. ............... 429/413 |

FOREIGN PATENT DOCUMENTS

| | | |
|---|---|---|
| WO | 2007/084142 A2 | 7/2007 |
| WO | 2007084142 A2 | 7/2007 |
| WO | 2010051557 A1 | 5/2010 |

OTHER PUBLICATIONS

Patent Cooperation Treaty (PCT), International Search Report and Written Opinion for Application No. PCT/US2012/033168, filed Apr. 12, 2012, mailed Jul. 17, 2012, European Patent Office, Netherlands.

* cited by examiner

HYDROGEN GENERATOR WITH IMPROVED VOLUME EFFICIENCY

CROSS-REFERENCE TO RELATED APPLICATIONS

This application claims the benefit of U.S. Provisional Application No. 61/477,641, filed Apr. 21, 2011, entitled Hydrogen Generator with Improved Volume Efficiency.

FIELD OF THE INVENTION

This invention relates to a hydrogen generator, particularly a hydrogen generator for a fuel cell system, and a method of producing hydrogen gas with the hydrogen generator.

BACKGROUND

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the negative electrode side of the fuel cell. In other types of hydrogen fuel cells, hydrogen gas is supplied to the fuel cell from a source outside the fuel cell. A fuel cell system can include a fuel cell battery, including one or more fuel cells, and a hydrogen source, such as a hydrogen tank or a hydrogen generator. In some fuel cell systems, the hydrogen source can be replaced after the hydrogen is depleted. Replaceable hydrogen sources can be rechargeable or disposable.

A hydrogen generator uses one or more reactants containing hydrogen that can react to produce hydrogen gas. The reaction can be initiated in various ways, such as hydrolysis and thermolysis. For example, two reactants can produce hydrogen and byproducts when mixed together. A catalyst can be used to catalyze the reaction. When the reactants react, reaction products including hydrogen gas and byproducts are produced.

In order to minimize the volume of the hydrogen generator, volume that is initially occupied by the reactants can be used to accommodate reaction products as the reactants are consumed by arranging the components of the hydrogen generator in a volume exchanging configuration. As reactants are consumed, volume that they had occupied is simultaneously made available to contain reaction products.

The hydrogen gas is separated from byproducts and unreacted reactants, and the gas exits the hydrogen generator and is provided to the fuel cell battery. Various means for separating the hydrogen gas are known, including porous filters to separate solids from the hydrogen gas and gas permeable, liquid impermeable membranes to separate the hydrogen gas from liquids.

It is desirable to further improve the volume efficiency of hydrogen generators while providing for effective separation of the hydrogen gas from reaction products and unreacted reactants. It is also desirable to provide a hydrogen generator having a simple design that is easily manufactured at a low cost.

SUMMARY

The above advantages are provided by a hydrogen generator according to the present invention.

Accordingly, one aspect of the invention is a method of producing hydrogen gas using a hydrogen generator including a container; a first reactant storage area within the container, the first reactant storage area having a volume and containing a liquid including a first reactant; a reaction area within the container, the reaction area having a volume; an effluent storage area within the container, the effluent storage area having a volume; a liquid passage from the first reactant storage area to the reaction area; an effluent passage from the reaction area to the effluent storage area; a compressed filter contained within the effluent storage area; a liquid impermeable, gas permeable component; and a hydrogen outlet. The first reactant is moved from the first reactant storage area, through the liquid passage, to the reaction area; the first reactant is reacted in the reaction area to produce hydrogen gas and an effluent; the hydrogen gas and the effluent are moved from the reaction area, through the effluent passage, to the effluent storage area; and the hydrogen gas is passed through the filter and the liquid impermeable, gas permeable component to the outlet. The first reactant storage area volume, the reaction area volume or both the first reactant storage area and the reaction area volumes decrease, the filter expands, and the effluent storage area volume increases as the first reactant is moved from the first reactant storage area and the hydrogen gas and the effluent are moved from the reaction area to the effluent storage area. A moveable partition separates the effluent storage area from at least one of the first reactant storage area and the reaction area, and a portion of the filter is attached to the moveable partition. All hydrogen gas passing to the outlet passes through the effluent storage area.

Embodiments of the first aspect of the invention can include one or more of the following features:

one or both of the expanding filter and a biased component applies a force to the first reactant storage area volume, the reaction area volume or both the first reactant storage area volume and the reaction area volume as the effluent is moved to the effluent storage area;

the filter has at least two areas of different porosity prior to compression; the filter can include at least two distinct components of different porosities prior to compression; preferably the area of greatest porosity prior to compression is closest to the effluent passage and the area of least porosity is closest to the liquid impermeable, gas permeable component;

the filter includes a material that does not have an affinity for a liquid in the effluent; preferably a portion of the filter proximate the effluent entryway to the effluent storage area does not have an affinity for the liquid in the effluent;

the filter includes a material that has an affinity for a liquid in the effluent; preferably a portion of the filter proximate the liquid impermeable, gas permeable component has an affinity for the liquid in the effluent;

the filter includes an open cell foam;

the moveable partition includes a flexible effluent enclosure within the effluent storage area, the flexible effluent enclosure has a volume, and the filter is contained within and attached to a portion of the flexible effluent enclosure; the moveable partition can further include a rigid wall adjacent to the flexible effluent enclosure; the volume of the flexible effluent enclosure can increase as the hydrogen gas and the effluent are moved to the effluent storage area;

the moveable partition can pull the filter to expand the filter;

the filter includes an elastic material, and the filter expands as a result of a reduction in a compressive stress in the filter;

the first reactant is initially contained within a flexible first reactant enclosure within the first reactant storage area; and the hydrogen generator includes a second reactant, and the second reactant reacts with the first reactant in the reaction area; the second reactant can be stored within the reaction area; the reaction area can include a catalyst configured to catalyze the reaction of the first and second reactants; the second reactant can be initially contained within a flexible second reactant enclosure within the reaction area; the flexible second reactant enclosure can be wrapped with a biasing component that applies a force to reduce the volume of the second reactant container as the hydrogen gas and the effluent are moved to the effluent storage area; at least one of the first reactant and the second reactant includes a borohydride; at least one of the first reactant and the second reactant is part of a composition that includes at least one of an acid and a metal compound catalyst.

A second aspect of the invention is a hydrogen generator including a container; a first reactant storage area within the container, the first reactant storage area having a volume and configured to contain a first liquid reactant; a reaction area within the container, the reaction area having a volume; a liquid passage from the first reactant storage area to the reaction area; an effluent storage area within the container, the effluent storage area having a volume and configured to store hydrogen gas and an effluent produced by a reaction of the first reactant within the reaction area; an effluent passage from the reaction area to the effluent storage area; an initially compressed filter within the effluent storage area; a liquid impermeable, gas permeable component in fluid communication with the effluent storage area; and a hydrogen outlet. The initially compressed filter is configured to expand to contain a portion of the effluent, the effluent storage area volume is configured to increased, and at least one of the first reactant storage area volume and the reaction area volume is configured to decrease during operation of the hydrogen generator. A moveable partition separates the effluent storage area from at least one of the first reactant storage area and the reaction area, and a portion of the filter is attached to the moveable partition. The first reactant can react to produce hydrogen gas, and all of the hydrogen gas must pass through a portion of the effluent storage area to reach the hydrogen outlet.

Embodiments of the second aspect of the invention can include one or more of the following features:

the filter is configured to apply a force for reducing the first reactant storage area volume, the reaction area volume or both the first reactant storage area volume and the reaction area volume during operation of the hydrogen generator;

the hydrogen generator further includes a biased component configured to apply a force for reducing the first reactant storage area volume, the reaction area volume or both the first reactant storage area volume and the reaction area volume during operation of the hydrogen generator;

the filter has at least two areas of different porosity prior to compression; the filter can include two distinct components, each having a different porosity prior to compression; preferably the area of greatest porosity prior to compression is closest to the effluent passage and the area of least porosity is closest to the outlet;

the filter includes a material that does not have an affinity for a liquid in the effluent; preferably a portion of the filter proximate the effluent entryway to the effluent storage area does not have an affinity for the liquid in the effluent;

the filter includes a material that has an affinity for a liquid in the effluent; preferably a portion of the filter proximate the liquid impermeable, gas permeable component has an affinity for the liquid in the effluent;

the filter includes an open cell foam;

the moveable partition includes a flexible effluent enclosure within the effluent storage area, the flexible effluent enclosure has a volume, and the filter is contained within and attached to a portion of the flexible effluent enclosure; the moveable partition can further includes a rigid wall adjacent to the flexible effluent enclosure; the volume of the flexible effluent enclosure can be configured to increase during operation of the hydrogen generator;

the filter includes an elastic material, and the filter expands as a result of a reduction in a compressive stress in the filter;

the first reactant is initially contained within a flexible first reactant container within the first reactant storage area;

the hydrogen generator further includes a second reactant; the second reactant can be initially contained within a flexible second reactant container within the reaction area; the flexible second reactant container can be wrapped with a biasing component configured to apply a force to reduce the volume of the second reactant container as the first reactant and the second reactant react; at least one of the first reactant and the second reactant can include a borohydride; at least one of the first reactant and the second reactant can be part of a composition that includes at least one of an acid and a metal compound catalyst; and the reaction area further includes a catalyst.

A third aspect of the invention is a hydrogen generator including a container; a first reactant storage area within the container, the first reactant storage area including a flexible enclosure having a volume configured to contain a fluid including a first reactant; a reaction area within the container, the reaction area including a flexible enclosure having a volume; a fluid passage from the first reactant storage area enclosure to the reaction area enclosure; an effluent storage area within the container, the effluent storage area including a flexible enclosure having a volume configured to store hydrogen gas and an effluent produced by a reaction of the first reactant within the reaction area; an effluent passage from the reaction area enclosure to the effluent storage area enclosure; a liquid impermeable, gas permeable component in fluid communication with the effluent storage area; and a hydrogen outlet. The flexible effluent enclosure separates the effluent storage area from at least one of the first reactant storage area and the reaction area. The hydrogen generator also includes an initially compressed filter within the effluent storage area enclosure; wherein a portion of the filter is attached to a portion of the flexible effluent storage area enclosure. The initially compressed filter is configured to expand to contain a portion of the effluent, the effluent storage area enclosure volume is configured to increased, and at least one of the first reactant storage area enclosure volume and the reaction area enclosure volume is configured to decrease during operation of the hydrogen generator. The first reactant can react to produce hydrogen gas, and all of the hydrogen gas must pass through a portion of the effluent storage area to reach the hydrogen outlet.

Embodiments of the third aspect of the invention can include one or more of the additional features of the second aspect of the invention disclosed above.

These and other features, advantages and objects of the present invention will be further understood and appreciated by those skilled in the art by reference to the following specification, claims and appended drawings.

Unless otherwise specified, the following definitions and methods are used herein:
- "effluent" means non-gaseous reaction products and unreacted reactants, solvents and additives;
- "expand" when used in describing a filter means for the filter material to simultaneously increase in volume, increase in porosity and decrease in density and pertains only to the material of which the filter is made;
- "flexible" means capable of changing shape, e.g., by stretching, bending, folding, unfolding, and so on;
- "initial" means the condition of a hydrogen generator in an unused or fresh (e.g., refilled) state, before initiating a reaction to generate hydrogen;
- "volume exchanging relationship" means a relationship between two or more areas or containers within a hydrogen generator such that a quantity of volume lost by one or more of the areas or containers is simultaneously gained by one or more of the other areas or containers; the volume thus exchanged is not necessarily the same physical space, so volume lost in one place can be gained in another place.

Unless otherwise specified herein, all disclosed characteristics and ranges are as determined at room temperature (20-25° C.).

DETAILED DESCRIPTION

Figure 1A:
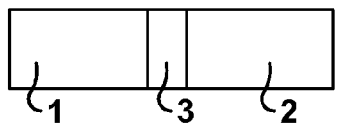
FIG. 1A is a schematic diagram of a first arrangement of a reactant storage area, a reaction area and an effluent storage area before use of hydrogen generator.

The present invention includes a separate hydrogen gas generator that can be incorporated into a fuel cell system including a fuel cell battery, but it is not part of the fuel cell itself. It is typically a removable, replaceable or refillable unit that can supply hydrogen to a fuel cell, rather than supplying a liquid or other fluid that is reformed by or within the fuel cell to produce hydrogen gas or protons.

The fuel cell with which the hydrogen generator can be used can be a battery containing a single fuel cell, or it can be a battery containing a plurality of fuel cells (sometimes referred to as a fuel cell stack). The fuel cell can be any type of fuel cell that uses hydrogen as a fuel. Examples include proton exchange membrane fuel cells, alkaline fuel cells and solid oxide fuel cells.

In one embodiment of the invention a hydrogen generator includes a container with one or more reactant storage areas, a reaction area and an effluent storage area within the container. One or more reactant-containing fluids, each containing one or more reactants, are transferred from the reactant storage area or areas to the reaction area, where the reactant or reactants react to produce hydrogen gas and byproducts. One or more reactants can also be initially contained within the reaction area. Reaction can be a catalyzed by a catalyst, which can be initially in the reaction area or contained in a fluid transferred to the reaction area. The byproducts can include gaseous, liquid and solid reaction products. The production of hydrogen gas forces effluent from the reaction area, through an effluent passage, to the effluent storage area. The effluent can include reaction byproducts as well as unreacted reactants and additives.

The reactant-containing fluid can be a liquid or other easily transported fluid. The reactant can be the fluid (e.g., water), or the reactant can be mixed, suspended, dissolved or otherwise contained in a liquid. After the fluid is transported from the reactant storage area to the reaction area, it reacts to produce hydrogen gas. In one embodiment the reactant or reactants react upon contact with a catalyst in the reaction area. In another embodiment two fluids, one or both including a reactant, are transported to the reaction area. The fluids may come in contact with each other in an intermediate mixing area or within the reaction area, where they react to produce hydrogen gas; the reaction may be catalyzed by a catalyst, which can be initially contained in the reaction area or in a fluid transported to the reaction area. In yet another embodiment one reactant is contained in the reaction area, preferably in a solid form, and another reactant is transported from the reactant storage area to the reaction area, where the reactants react to produce hydrogen gas; the reaction may be catalyzed by a catalyst in the reaction area.

The reactant storage, reaction and effluent storage areas are arranged in a volume exchanging configuration such that, as reactants are consumed during operation of the hydrogen generator, the effluent storage area simultaneously increases in volume by moving into space made available by a reduction in volume of the areas initially containing reactant to accommodate the effluent within the effluent storage area. In this way the total volume of the hydrogen generator can be minimized, since the amount of initial void volume within the hydrogen generator can be kept at a minimum (though some initial void volume may be necessary, if the solid and liquid reaction products have a greater volume than the initial total volume of the reactants for example). Any suitable volume exchanging configuration can be used. For example, one or more areas containing reactant (e.g., a reactant storage area and/or a reaction area containing a reactant) can be adjacent to the effluent storage area, or the effluent storage area can be separated from the areas containing reactant by one or more other components of the hydrogen generator that can move or otherwise allow the volume exchange.

Hydrogen gas is separated from the liquid and solid effluent and is released through the hydrogen outlet to an apparatus such as a fuel cell as needed. A filter and a hydrogen permeable, liquid impermeable component are used to separate the hydrogen. The filter removes solids and may remove liquids as well, and the hydrogen permeable, liquid impermeable component removes liquids and any remaining solids, allowing only gas to pass through the hydrogen outlet. Optionally, other components may be included within or downstream from the hydrogen generator to remove other gases and impurities from the hydrogen flow.

The filter is initially compressed within the effluent storage area to reduce its initial volume and porosity. As the hydrogen generator is operated and the effluent storage area increases in volume, the filter expands. This has several advantages. First, the filter is initially smaller in size, allowing the effluent storage area to be smaller initially, thereby contributing to the volumetric efficiency of the hydrogen generator. Second, the filter can better conform to the size of the effluent storage area and reduce the flow of effluent around the filter as the effluent storage area becomes larger. Third, as the filter becomes more porous it may be better able to continue to remove particulate material without becoming clogged. Fourth, the filter can provide a force (in addition to any force applied by the hydrogen gas, the effluent and any other component, such as a biasing component) to facilitate the increase in volume of the effluent storage area.

In various embodiments, as space becomes available as a result of the volume exchange, the filter can expand due to its elasticity, by being pulled by another internal component of the hydrogen generator to which the filter is attached, by a biasing member within or surrounded by the filter, by some other means, or a combination thereof. For example, an elastic material can expand due to a reduction in compressive stress. It is advantageous for a portion of the filter to be attached to a moveable partition that separates the effluent storage area from the first reactant storage area and/or the reaction area. This can assure that the partition and the filter move together, preventing a gap from forming between the filter and the partition and preventing effluent from bypassing the filter by flowing through the gap. The filter can also be attached to other components within or surrounding the effluent storage area (such as a wall on the opposite side of the filter from the moveable partition) to prevent gaps from forming around other portions of the filter as the filter expands. For example, one portion of the filter can be attached to an internal surface of the housing, and an opposite portion of the filter can be attached to the moveable partition. The filter can help to move the moveable partition and enlarge the effluent storage area as the hydrogen generator is used, or the moveable partition can pull the attached portion of the filter (e.g., away from the housing surface to which the filter is also attached), expanding the filter. In addition to or instead of being moved by force applied by the expanding filter, the moveable partition can be moved by a biasing member such as a spring or by a pressure differential on opposite sides of the partition, for example. In yet another example, one or more springs can be disposed within the filter so the filter is forced to expand by the springs. In one embodiment the moving partition can be a wall, such as a rigid wall, between the effluent storage area and one or both of the first reactant storage area and the reaction area. In another embodiment the moving partition can be a flexible effluent enclosure (described in detail below) enclosing the effluent storage area and containing the filter. In yet another embodiment the moving partition includes both a flexible effluent enclosure and a separate wall between the effluent storage area and at least one of the first reactant storage area and the reaction area. The filter can be attached to the moveable partition in any suitable manner, such as adhering with an adhesive, fastening with one or more fasteners (e.g., clamps, screws, rivets and the like), or strapping with one or more straps (e.g., cords, bands, belts and the like).

The filter can be a single component filter. It can have a uniform composition and porosity before compression, or the composition and porosity can vary. In one embodiment the filter before compression is more porous in an upstream portion (the portion that will be closer to the effluent passage) and less porous in a downstream portion (the portion that will be closer to the hydrogen outlet). In this way the filter can remove larger particles in the upstream portion while allowing smaller particles to pass to the downstream portion, to help prevent clogging of the filter.

The filter can be a multi-component filter, at least one component of which is initially compressed and expands during operation of the hydrogen generator. Two or more components can have different porosities before compression. It can be advantageous for a higher porosity filter component to be located at the upstream side of the filter and a lower porosity filter component to be located at the downstream side of the filter. If there are more than two filter components, they can be arranged according to porosity, with the more porous filter components being upstream from the less porous filter components. The individual filter components can be of uniform or non-uniform composition and porosity. All filter components can be made of the same type of material, or different materials can be used for individual filter components. Two or more filter components can be joined together to create a laminar filter having different layers. Filter components can be joined by any suitable method, such as by bonding with an adhesive.

The filter material and the amount of initial compression can be selected, based at least in part on the expected amount and composition of the effluent, to provide at least a minimum filter porosity at all times as the filter expands and retains a portion of the effluent during use of the hydrogen generator, such that sufficient hydrogen gas can reach the hydrogen permeable, liquid impermeable component and the outlet to provide at least a minimum desired hydrogen flow rate.

Desirable properties of the filter components and the materials from which they are made include: chemical stability in contact with the effluent during at least the expected duration of use, compressibility, the ability to expand or be expanded to the desired extent after being compressed before and during use, and porosity and pore size distribution within the desired ranges before and during use. Affinity or lack of affinity for liquid in the effluent can also be considered in material selection.

In one embodiment, at least a portion of the filter is made from a material that does not have an affinity for, and may even tend to repel liquid in the effluent. For example, where the effluent contains an aqueous liquid, a portion of the filter may be a material that is not hydrophilic and may be hydrophobic. If only a portion of the filter does not have an affinity for or tends to repel liquid in the effluent, preferably at least that portion of the filter is proximal to the effluent entryway to the effluent storage area. In this way the portion of the filter proximal to the effluent entryway can remove solids from the hydrogen gas flow, and as the filter expands the filter can accommodate an increasing amount of solids. In this embodiment, it may be possible to avoid premature blocking of the pores in that portion of the filter due to swelling that may accompany absorption of liquid.

In another embodiment, at least a portion of the filter is made from a material that has an affinity for liquid in the effluent. For example, where the effluent contains an aqueous liquid, a portion of the filter may be hydrophilic. If only a portion of the filter has an affinity for liquid in the effluent, preferably at least that portion of the filter is proximal to the liquid-impermeable, gas-permeable component and/or the hydrogen outlet has an affinity for liquid in the effluent. In this way the portion of the filter can absorb liquid that may have solids dissolved therein and prevent blockage of the liquid-impermeable, gas-permeable component and/or the hydrogen outlet.

In yet another embodiment, the filter has both a portion that does not have an affinity for, and may even tend to repel liquid in the effluent, and another portion that has an affinity for liquid in the effluent. The portion that does not have an affinity for liquid in the effluent is proximal the effluent entryway to the effluent storage area, and the portion that has an affinity for liquid in the effluent is proximal one or both of the liquid-impermeable, gas-permeable component and/or the hydrogen outlet.

The hydrogen permeable, liquid impermeable component can be located within the effluent storage area, within the hydrogen outlet, or at an interface between the outlet and either or both of the effluent storage area and a hydrogen passage from the outlet to the fuel cell. In some embodiments it is highly permeable to hydrogen and less permeable to other gases that may be present with the hydrogen, as byproducts or contaminants for example. The hydrogen permeable, liquid impermeable material can be any suitable form, such as a sheet, a membrane or a non-planar form.

Filter components, the hydrogen permeable, liquid impermeable material or both can be coated or partially filled with one or more other materials such as a catalyst to facilitate reaction of unreacted reactants contained in the effluent, an ion-exchange resin to capture detrimental impurities in the effluent, a defoamer to break up gas bubbles in the effluent, and a surfactant to improve the flowability of the effluent.

Any or all of the reactant storage area(s), the reaction area and the effluent storage area can be defined by one or more of the internal surfaces of the container and other components of the hydrogen generator, or one or more of these areas can be enclosed by an enclosure, such as a reactant storage enclosure, a reaction area enclosure or an effluent storage area enclosure. Such enclosures are able to undergo a change in shape (e.g., by being flexible) so their internal volume can decrease or increase as material exits or enters the enclosure. An enclosure can include a structure such as a bag, a balloon or a bellows, for example. The walls of an enclosure can be pleated or made from an elastomeric material that can stretch or contract, for example, to enable a change in internal volume. In one embodiment, an enclosure can have a wall or a portion of a wall that can stretch to provide a larger internal volume and can apply a force to the contents to facilitate emptying the contents.

In one embodiment, the effluent storage area is enclosed by an enclosure. One or more filter components can be fastened to the enclosure in one or more places to minimize the amount of effluent that can flow around the filter component. The enclosure can be or can include a hydrogen permeable, liquid impermeable material to separate hydrogen gas from liquids in the effluent storage area.

A fluid including a reactant can be transported from the reactant storage area by any suitable means. For example, it can be wicked, pumped, expelled by applying a force on the liquid, or a combination thereof. If the fluid is pumped, the pump can be within or outside the hydrogen generator. The pump can be powered by the fuel cell, a battery within the hydrogen generator, or an external power source. A force can be applied directly against a reactant storage area enclosure, against a moveable partition in contact with the enclosure, or against one or more other components that make contact with or are a part of the enclosure (such as a valve assembly) for example. Force can be provided in various ways, such as with a spring, an elastic reactant storage enclosure that is initially stretched when full, wrapping the reactant storage enclosure with an elastic member, air or gas pressure on or within the reactant storage enclosure, the expansion of the filter in the effluent storage area, or a combination thereof.

The flow path of the fluid reactant composition to and within the reactant area can include various components such as tubes, wicks connections, valves, etc. Within the reaction area the fluid reactant composition can be dispersed by a dispersing member to improve the distribution of fresh reactant. The dispersing member can include one or more structures extending into or within the reaction area. The structures can be tubular or can have other shapes. At least a portion of the dispersing member can be flexible so it can move as the reactant composition and/or the reaction area change shape during operation of the hydrogen generator. In one embodiment the dispersing member can include a tube with holes or slits therein through which the fluid reactant composition can exit. In another embodiment the dispersing member can include a porous material through which the fluid reactant composition can permeate. In another embodiment the dispersing member can include a material through which the fluid reactant composition can wick. In yet another embodiment a sleeve of wicking material is provide around another component of the dispersing member. This can keep solid reaction byproducts from forming on the other component and clogging the holes, slits, pores, etc., and preventing the flow of fluid reaction composition.

The generation of hydrogen gas can be controlled so hydrogen is produced as needed. Control can be based on one or more criteria, such as: pressure (e.g., internal pressure or a differential between an internal and an external pressure); temperature (e.g., hydrogen generator, fuel cell or device temperature); a fuel cell electrical condition (e.g., voltage, current or power); or a device criterion (e.g., internal battery condition, power input, or operating mode).

The hydrogen generator can use a variety of reactants that can react to produce hydrogen gas. Examples include chemical hydrides, alkali metal silicides, metal/silica gels, water, alcohols, dilute acids and organic fuels (e.g., N-ethylcarbazole and perhydrofluorene).

As used herein, the term "chemical hydride" is broadly intended to be any hydride capable of reacting with a liquid to produce hydrogen. Examples of chemical hydrides that are suitable for use in the hydrogen generating apparatus described herein include, but are not limited to, hydrides of elements of Groups IA-IVA of the Periodic Table and mixtures thereof, such as alkaline or alkali metal hydrides, or mixtures thereof. Specific examples of chemical hydrides include lithium hydride, lithium aluminum hydride, lithium borohydride, sodium hydride, sodium borohydride, potassium hydride, potassium borohydride, magnesium hydride, calcium hydride, and salts and/or derivatives thereof. In an embodiment, a chemical hydride such as sodium borohydride can react with water to produce hydrogen gas and a byproduct such as a borate. This can be in the presence of a catalyst, heat, a dilute acid or a combination thereof.

An alkali metal silicide is the product of mixing an alkali metal with silicon in an inert atmosphere and heating the resulting mixture to a temperature of below about 475° C., wherein the alkali metal silicide composition does not react with dry $O_2$. Such alkali metal silicides are described in US Patent Publication 2006/0002839. While any alkali metal, including sodium, potassium, cesium and rubidium may be used, it is preferred that the alkali metal used in the alkali metal silicide composition be either sodium or potassium. Metal silicides including a Group IIA metal (beryllium, magnesium, calcium, strontium, barium and radium) may also be suitable. In an embodiment, sodium silicide can react with water to produce hydrogen gas and sodium silicate, which is soluble in water.

A metal/silica gel includes a Group IA metal/silica gel composition. The composition has a Group IA metal absorbed into the silica gel pores. The Group IA metals include sodium, potassium, rubidium, cesium and alloys of two or more Group IA metals. The Group IA metal/silica gel composition does not react with dry $O_2$. Such Group IA metal/silica gel compositions are described in U.S. Pat. No. 7,410,567 B2 and can react rapidly with water to produce hydrogen gas. A Group IIA metal/silica gel composition, including one or more of the Group IIA metals (beryllium, magnesium, calcium, strontium, barium and radium) may also be suitable.

The reactant composition contained in the reactant storage area is a fluid that can be transported from the reactant storage area to the reaction area. The fluid can be or include a liquid such as water, alcohol, a dilute acid, or a combination thereof. A reactant can be mixed, dissolved or suspended in the liquid, as long as there is no substantial reaction prior to reaching the reaction area. For example, the fluid can be a chemical hydride dissolved in water and the chemical hydride does not react with the water until the reaction is initiated by contact with a catalyst, heat or acid in the reaction area.

One or more catalysts can be used to catalyze the hydrogen producing reactions. Examples of suitable catalysts include transition metals from Group VIII (iron, cobalt, nickel, ruthenium, rhodium, palladium, osmium, iridium and platinum), Group IB (copper, silver and gold) and Group IIB (zinc, cadmium and mercury) of the Periodic Table of the Elements, as well as other transition metals including scandium, titanium, vanadium, chromium and manganese. Suitable catalysts also include metal salts, such as chlorides, oxides, nitrates and acetates. Some metal salts can be dissolved in a reactant-containing fluid.

Additives can be used for various purposes. For example, additives can be included with a solid reactant as a binder to hold the solid material in a desired shape or as a lubricant to facilitate the process of forming the desired shape. Other additives can be included with a liquid or solid reactant composition to control pH, to control the rate of reaction for example. Such additives include but are not limited to acids (e.g., hydrochloric, nitric, acetic, sulfuric, citric, carbonic, malic, phosphoric and acetic acids or combinations thereof), or basic compounds. Additives such as alcohols and polyethylene glycol based compounds can be used to prevent freezing of the fluid. Additives such as surfactants or wetting agents can be used to control the liquid surface tension and reaction product viscosity to facilitate the flow of hydrogen gas and/or effluents. Additives such as porous fibers (e.g., polyvinyl alcohol and rayon) can help maintain the porosity of a solid reactant component and facilitate even distribution of the reactant containing fluid and/or the flow of hydrogen and effluents.

In one embodiment a chemical hydride such as sodium borohydride (SBH) is one reactant, and water is another reactant. The SBH can be a component of a liquid such as water. The SBH and water can react when they come in contact with a catalyst, acid or heat in the reaction chamber. The SBH can be stored as a solid in the reaction area. It can be present as a powder or formed into a desired shape. If an increased rate of reaction between the SBH and the water is desired, a solid acid, such as malic acid, can be mixed with the SBH, or acid can be added to the water. Solid (e.g. powdered) SBH can be formed into a mass, such as a block, tablet or pellet, to reduce the amount of unreacted SBH contained in the effluent that exits the reaction area. As used below, "pellet" refers to a mass of any suitable shape or size into which a solid reactant and other ingredients are formed. The pellet should be shaped so that it will provide a large contact surface area between the solid and liquid reactants. Preferably water is another reactant. For example, a mixture including about 50 to 65 weight percent SBH, about 30 to 40 weight percent malic acid and about 1 to 5 weight percent polyethylene glycol can be pressed into a pellet. Optionally, up to about 3 weight percent surfactant (anti-foaming agent). up to about 3 weight percent silica (anti-caking agent) and/or up to about 3 weight percent powder processing rheology aids can be included. The density of the pellet can be adjusted, depending in part on the desired volume of hydrogen and the maximum rate at which hydrogen is to be produced. A high density is desired to produce a large amount of hydrogen from a given volume. On the other hand, if the pellet is too porous, unreacted SBH can more easily break away and be flushed from the reaction area as part of the effluent. One or more pellets of this solid reactant composition can be used in the hydrogen generator, depending on the desired volume of hydrogen to be produced by the hydrogen generator. The ratio of water to SBH in the hydrogen generator can be varied, based in part on the desired amount of hydrogen and the desired rate of hydrogen production. If the ratio is too low, the SBH utilization can be too low, and if the ratio is too high, the amount of hydrogen produced can be too low because there is insufficient volume available in the hydrogen generator for the amount of SBH that is needed.

It may be desirable to provide for cooling of the hydrogen generator during use, since the hydrogen generation reactions can produce heat. The housing may be designed to provide coolant channels. In one embodiment standoff ribs can be provided on one or more external surfaces of the housing and/or interfacial surfaces with the fuel cell system or device in or on which the hydrogen generator is installed or mounted for use. In another embodiment the hydrogen generator can include an external jacket around the housing, with coolant channels between the housing and external jacket. Any suitable coolant can be used, such as water or air. The coolant can flow by convection or by other means such as pumping or blowing. Materials can be selected and/or structures, such as fins, can be added to the hydrogen generator to facilitate heat transfer.

It may also be desirable to provide means for heating the hydrogen generator, particularly at startup and/or during operation at low temperatures.

The hydrogen generator can include other components, such as control system components for controlling the rate of hydrogen generation (e.g., pressure and temperature monitoring components, valves, timers, etc.), safety components such as pressure relief vents, thermal management components, electronic components, and so on. Some components used in the operation of the hydrogen generator can be located externally rather than being part of the hydrogen generator itself, making more space available within the hydrogen generator and reducing the cost by allowing the same components to be reused even though the hydrogen generator is replaced.

The hydrogen generator can be disposable or refillable. For a refillable hydrogen generator, reactant filling ports can be included in the housing, or fresh reactants can be loaded by opening the housing and replacing containers of reactants. If an external pump is used to pump fluid reactant composition from the reaction storage area to the reactant area, an external connection that functions as a fluid reactant composition outlet to the pump can also be used to refill the hydrogen generator with fresh fluid reactant composition. Filling ports can also be advantageous when assembling a new hydrogen generator, whether it is disposable or refillable. If the hydrogen generator is disposable, it can be advantageous to dispose components with life expectancies greater than that of the hydrogen generator externally, such as in the fuel cell system or an electrical appliance, especially when those components are expensive.

The reactant storage area, reaction area and effluent storage area can be arranged in many different ways, as long as effluent storage area is in a volume exchanging relationship with one or both of the reactant storage and reaction areas that will allow the initially compressed filter to expand as the effluent storage area increases in volume. Other considerations in selecting an arrangement include thermal management (adequate heat for the desired reaction rate and dissipation of heat generated by the reactions), the desired locations of external connections (e.g., for hydrogen gas, fluid reactant flow to and from an external pump), any necessary electrical connections (e.g., for pressure and temperature monitoring and control of fluid reactant flow rate), and ease of assembly.

FIGS. 1A to 8B illustrate various possible arrangements of the reactant storage area 1, the reaction area 2 and the effluent storage area 3 of a hydrogen generator. Each pair of drawing figures A and B shows a comparison of relative sizes of the components before and after using the hydrogen generator, respectively. These drawings are not to scale and do not show any other components of the hydrogen generator. They show only a few of many possible arrangements that can be used.

Figure 1B:
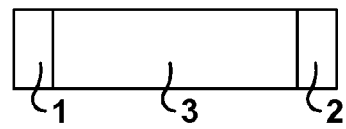
FIG. 1B is a schematic diagram of a first arrangement of a reactant storage area, a reaction area and an effluent storage area after use of hydrogen generator.

FIGS. 1A and 1B show an arrangement with the reactant storage area 1 and the reaction area 2 separated by the effluent storage area 3. As clear from a comparison of FIG. 1A with FIG. 1B, the effluent storage area 3 is in a volume exchanging relationship with both the reactant storage area 1 and the reaction area 2.

Figure 2A:
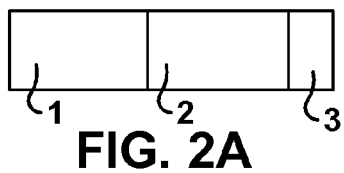
FIG. 2A is a schematic diagram of a second arrangement of a reactant storage area, a reaction area and an effluent storage area before use of hydrogen generator.
Figure 2B:
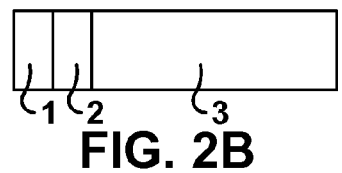
FIG. 2B is a schematic diagram of a second arrangement of a reactant storage area, a reaction area and an effluent storage area after use of hydrogen generator.

FIGS. 2A and 2B show an arrangement similar to the arrangement in FIGS. 1A and 1B, except that the effluent storage area 3 is on one end rather than between the reactant storage area 1 and the reaction area 2. Although in FIGS. 2A and 2B the effluent storage area is adjacent to the reaction area 2, the areas 1, 2 and 3 can be arranged with the effluent storage area 3 adjacent to the reactant storage area. Even though the effluent storage area 3 is adjacent to only one of the other two areas, it is in a volume exchanging relationship with both since the amount of volume increase in the effluent storage area 3 includes volume reductions in both the reactant storage area 1 and the reaction area 2.

Figure 3A:
FIG. 3A is a schematic diagram of a third arrangement of a reactant storage area, a reaction area and an effluent storage area before use of hydrogen generator.
Figure 3B:
FIG. 3B is a schematic diagram of a third arrangement of a reactant storage area, a reaction area and an effluent storage area after use of hydrogen generator.

FIGS. 3A and 3B also show an arrangement similar to the arrangement in FIGS. 1A and 1B, except that while the areas 1, 2 and 3 are arranged in a horizontal or linear configuration in FIGS. 1A and 1B, they are arranged in a vertical or stacked configuration in FIGS. 3A and 3B. The sequence of the areas 1, 2 and 3 in a stacked configuration can also be varied, in a similar manner as described above with reference to FIGS. 2A and 2B.

Figure 4A:
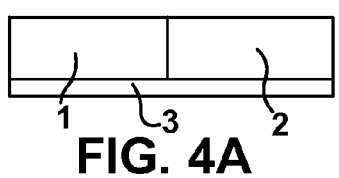
FIG. 4A is a schematic diagram of a fourth arrangement of a reactant storage area, a reaction area and an effluent storage area before use of hydrogen generator.
Figure 4B:
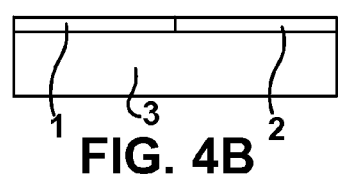
FIG. 4B is a schematic diagram of a fourth arrangement of a reactant storage area, a reaction area and an effluent storage area after use of hydrogen generator.

FIGS. 4A and 4B show another arrangement with two of the areas (areas 1 and 2) side by side, stacked on the other area (area 3). As described above, the locations of the individual areas 1, 2 and 3 can be varied in this type of arrangement.

Figure 5A:
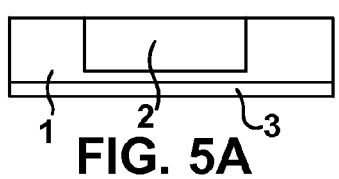
FIG. 5A is a schematic diagram of a fifth arrangement of a reactant storage area, a reaction area and an effluent storage area before use of hydrogen generator.
Figure 5B:
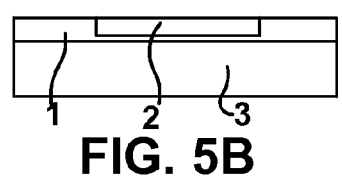
FIG. 5B is a schematic diagram of a fifth arrangement of a reactant storage area, a reaction area and an effluent storage area after use of hydrogen generator.
Figure 6A:
FIG. 6A is a schematic diagram of a sixth arrangement of a reactant storage area, a reaction area and an effluent storage area before use of hydrogen generator.
Figure 6B:
FIG. 6B is a schematic diagram of a sixth arrangement of a reactant storage area, a reaction area and an effluent storage area after use of hydrogen generator.

FIGS. 5A and 5B, as well as FIGS. 6A and 6B, show arrangements in which one of the areas 1, 2 and 3 is adjacent to more than one side of another of the areas 1, 2 and 3. As described above, the locations of the individual areas 1, 2 and 3 can be interchanged in these types of arrangements.

Figure 7A:
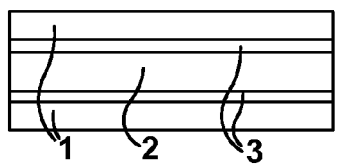
FIG. 7A is a schematic diagram of a seventh arrangement of a reactant storage area, a reaction area and an effluent storage area before use of hydrogen generator.
Figure 7B:
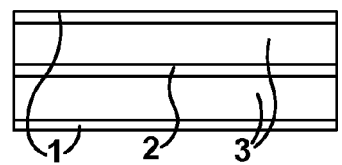
FIG. 7B is a schematic diagram of a seventh arrangement of a reactant storage area, a reaction area and an effluent storage area after use of hydrogen generator.

The arrangement shown in FIGS. 7A and 7B shows one reaction area 2, with an effluent storage area 3 adjacent to two opposite sides of the reaction area 2, and a reactant storage area 1 adjacent to each of the effluent storage areas 3. In some embodiments the two effluent storage areas 3 can be different portions of a single effluent storage area 3, joined by another portion(s) of effluent storage area 3 in another plane(s), and/or the two reactant storage areas 2 can be different portions of a single reactant storage area 1, joined by another portion(s) of reaction storage area 1 in another plane(s). As in the arrangements described above, the locations of areas 1, 2 and 3 in FIGS. 7A and 7B can be interchanged.

Figure 8A:
FIG. 8A is a schematic diagram of a eighth arrangement of a reactant storage area, a reaction area and an effluent storage area before use of hydrogen generator.
Figure 8B:
FIG. 8B is a schematic diagram of a eighth arrangement of a reactant storage area, a reaction area and an effluent storage area after use of hydrogen generator.

The arrangement in FIG. 8A is similar to the arrangement in FIG. 4A in that two areas are side by side and stacked on top of the other area before use of the hydrogen generator. However, FIGS. 8A and 8B illustrate an embodiment in which the increase in volume of the effluent storage area 3 is less than the sum of the volume reductions of the reactant storage area 1 and the reaction area 2, or an embodiment in which the effluent storage area 3 is in a volume exchanging relationship with only one of the other two areas (the reaction area 2 in this example, but it could be the reaction storage area 1 in another example). As shown in FIG. 8B, as reactant in the reactant storage area 1 is used volume initially occupied by the reactant that is removed from the reactant storage area 1 becomes unoccupied as the hydrogen generator is used, as represented by the "empty area" 4. Similar embodiments are possible with other arrangements, including those represented by FIGS. 1A to 7B.

Figure 9:
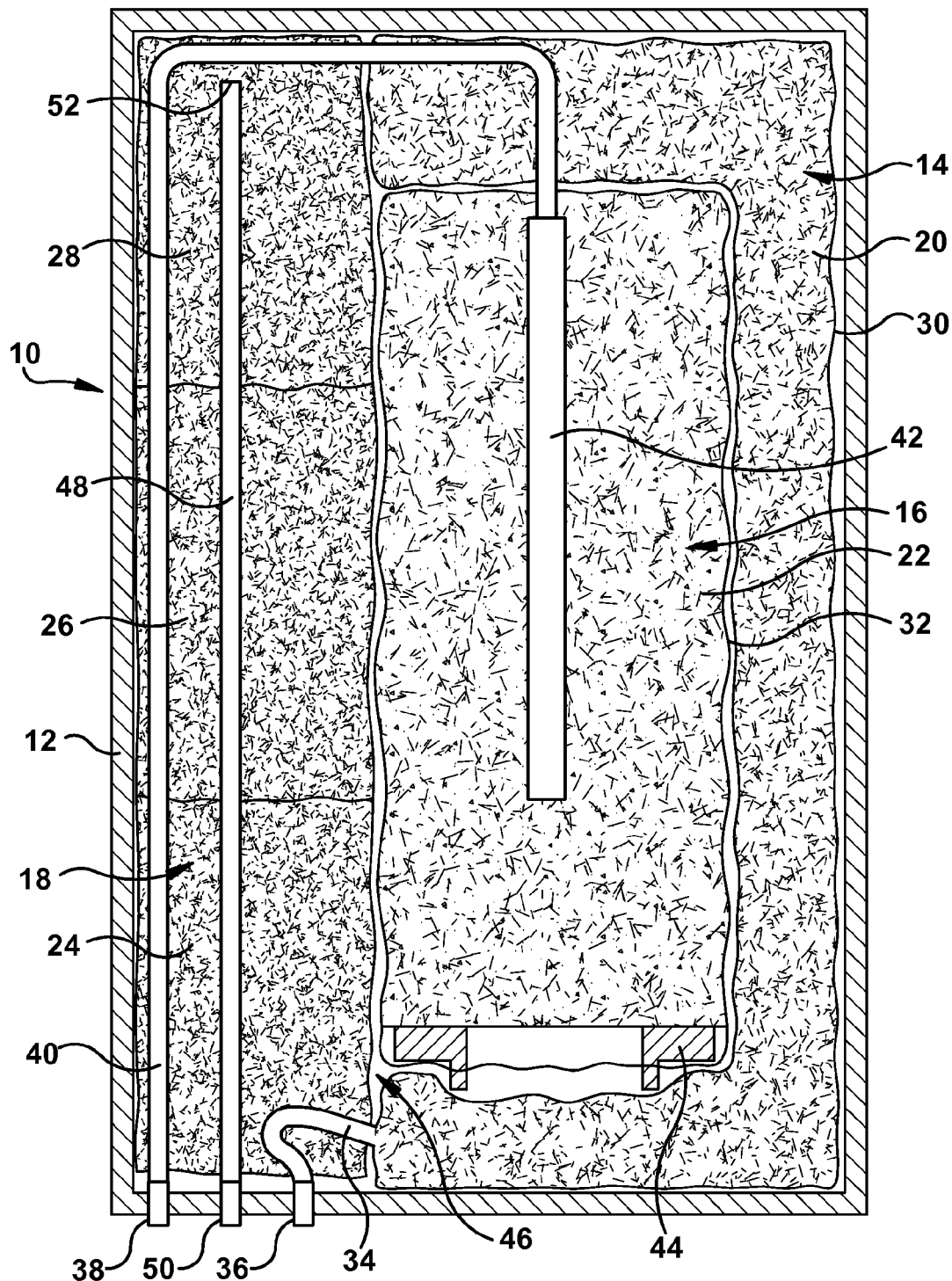
FIG. 9 is a cross-sectional drawing of a first embodiment of a hydrogen generator.
Figure 10:
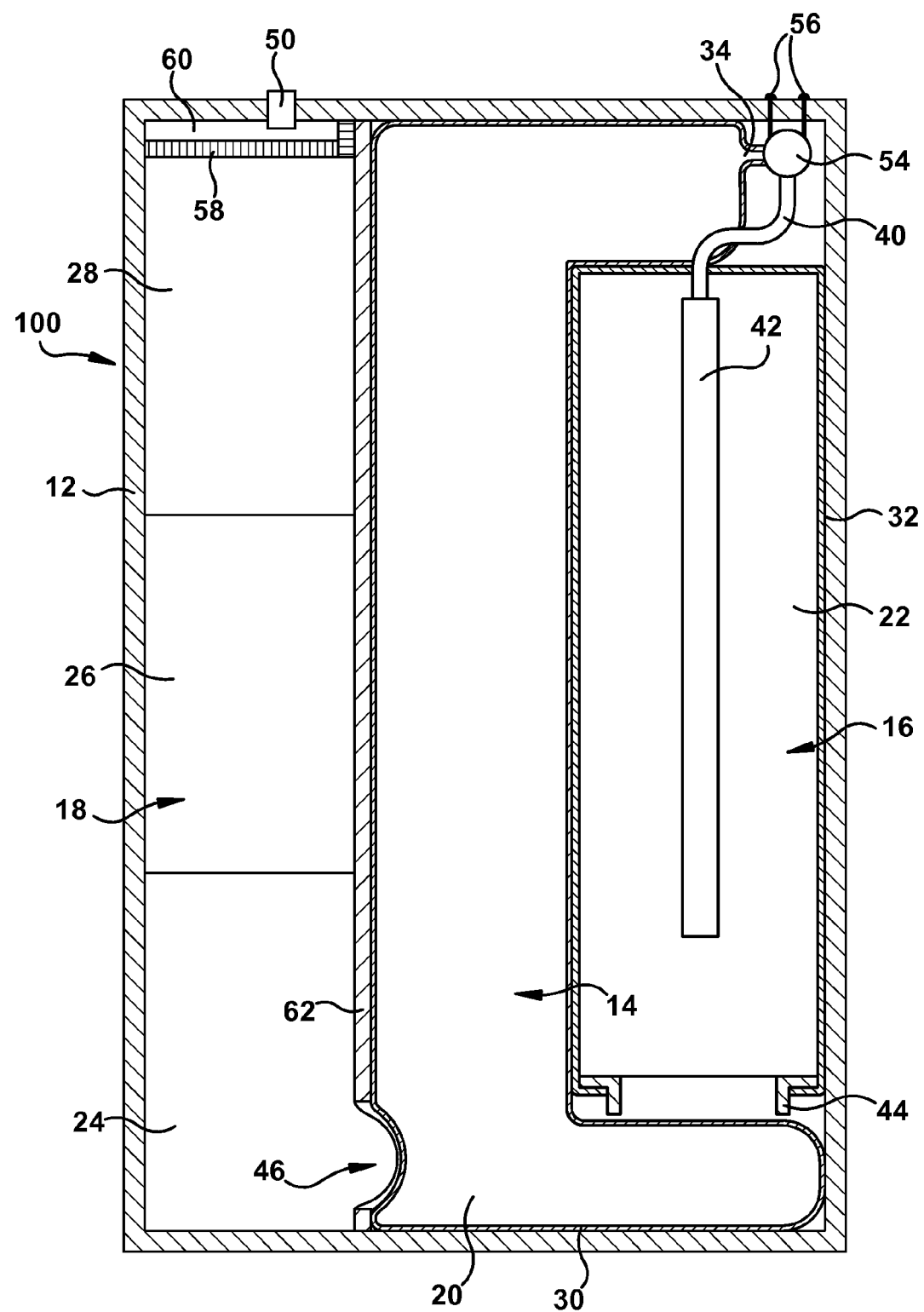
FIG. 10 is a cross-sectional drawing of a second embodiment of a hydrogen generator.

Embodiments of a hydrogen generator are described below with reference to FIGS. 9 and 10. The hydrogen generators 10 and 100 include a reactant storage area 14, a reaction area 16 and an effluent storage area 18 within a housing 12. A first reactant composition 20 is contained within the reactant storage area 14, and a second reactant composition 22 is contained within the reaction area 16. The first reactant composition 20 is a fluid that can be transported to the reaction area 16. The second reactant composition 22 can be a fluid or, as shown in FIGS. 9 and 10, it can be a solid. The effluent storage area 18 includes a filter, which can have one or more filter components, such as three filter components 24, 26, 28. The reactant storage area 14 is enclosed by an enclosure 30. The reaction area 16 can be at least partially enclosed by an optional enclosure 32. The effluent storage area 18 can be enclosed by an optional enclosure (not shown). Various types of enclosures can be used for the reactant storage area 14, the reaction area 16 and the effluent storage area 18. For example, an enclosure can include internal surfaces of the housing 12, other internal components of the hydrogen generator 10, 100 and/or it can share a common wall or section with one or more other enclosures. All or portions of the enclosures can be flexible, rigid, stationary or moveable, as long as the effluent storage area 18 is in a volume exchanging relationship with at least one of the reactant storage area 14 and the reaction area 16. As shown in FIGS. 9 and 10, the enclosures 30 and 32 enclosing the reactant storage area 14 and the reaction area 16, respectively, are flexible enclosures that can collapse on contact as first reactant composition 20 exits the reaction storage area 14 and effluent exits the reaction area 16. Examples of flexible enclosures include bags, balloons and bellows. It can be advantageous for flexible enclosures to be elastic so they can be stretched when full and tend to contract back to their original size as the contents exit, thereby helping to expel fluids as the hydrogen generator 10, 100 is operated.

During use of the hydrogen generator 10, 100, first reactant composition 20 is transported from the reactant storage area 14 to the reaction area 16 by any suitable means, as described above. For example, the first reactant composition 20 can be transported through a fluid outlet passage 34. If a pump is used, the pump 54 can be within the housing 12 as shown in FIG. 10, or it can be located externally as in the embodiment in FIG. 9. When a pump 54 is used, the first reactant composition 20 can be pumped through the fluid outlet passage 34, such as a tube, and, as shown in FIG. 9, a fluid outlet connection 36 to the pump. Optional features, such as valves, filters and the like can be incorporated into the fluid outlet passage 34 or the fluid outlet connection 36. An external pump 54 can pump the first reactant composition 20 back into the hydrogen generator 10, 100 through a fluid inlet connection 38. The first reactant composition 29 can flow to the reaction area 16 through a fluid inlet passage 40, such as a tube. Optional features such as valves, filters and the like can be incorporated into the fluid inlet connection 38. The first reactant composition 20 can exit the fluid inlet passage 40 directly from an opening in the end of the fluid inlet passage 40 or be delivered though a dispersing member 42 to disperse the first reactant composition over a larger portion of the reaction area 16. The dispersing member 42 can include one or more structures that extend into the reaction area 16. The structures can be essentially linear, as shown in FIGS. 9 and 10, or they can have other shapes, as described above.

When an internal or external pump 54 is used, it can be powered at least initially by an external power source, such as the fuel cell or another battery within a fuel cell system or an electrical appliance. If the pump 54 is within the container 12 (FIG. 10), connection can be made to an external power source through electrical contacts 56. Alternatively, a battery can be located within the container to at least start the pump 54.

The second reactant composition 22 can be a solid composition containing a second reactant that will react with the first reactant in the first reactant composition 20. The second reactant composition 22 can be in a convenient form such as a pellet containing the second reactant and any desired additives. An optional catalyst can be included in or downstream from the reaction area. For example, the catalyst can be on or part of the reaction area enclosure 32, dispersed in the second reactant composition 22, or carried into the reaction area as part of the first reactant composition 20.

As the first reactant composition 20 comes in contact with the second reactant composition 22, the first and second reactants react to produce hydrogen gas and byproducts. The hydrogen gas flows out of the reaction area 22 and through an effluent passage to an effluent entryway 46, where it enters the effluent storage area 18. The hydrogen gas carries with it effluent that includes byproducts as well as unreacted reactants and other constituents of the reactant compositions 20, 22. Where a reaction area enclosure 32 is used, the effluent exits the reaction area though an aperture in the enclosure 32. The opening in the reaction area enclosure 32 can include an effluent exit nozzle 44, which can help keep the aperture open. The effluent exit nozzle 44 can optionally include a screen to hold large pieces of the second reactant composition 22 in the reaction area 16 to improve utilization of the second reactant. The effluent passageway can be a structure such as a tube (not shown) extending between the effluent exit nozzle 44 and the effluent entryway 46, or it can be spaces that are present or develop between the effluent exit nozzle 44 and the effluent entry 46, as in FIGS. 9 and 10. Although it is desirable for the majority of the reactants to react within the reaction area 16, unreacted reactants in the effluent can continue to react after exiting the reaction area 16. An optional secondary reaction area (not shown) can be included between the primary reaction area 16 and the effluent storage area 18. Fresh first reactant composition 20 can be transported directly to this secondary reaction area, such as through a second fluid passage (not shown), to react with unreacted second reactant in the effluent from the primary reaction area 16. A catalyst can be disposed within the secondary reaction area.

Hydrogen gas and effluent entering a proximal portion of the effluent storage area 18 through the effluent entryway 46 flows through the filter 24, 26, 28 toward a distal portion of the effluent storage area 18. As the hydrogen gas and effluent flow through the filter 24, 26, 28, hydrogen gas is separated from solid particles of the effluent by the filter 24, 26, 28, which can be a single filter component or multiple filter components, such as the three filter components 24, 26, 28 shown in FIGS. 9 and 10. As described above, the filter 24, 26, 28 can have portions and/or filter components of different porosities, preferably increasing in porosity from the proximal portion toward the distal portion of the effluent storage area 18, where the hydrogen gas exits the effluent storage area 18.

The hydrogen gas is separated from liquids and any remaining solids in the effluent before exiting the hydrogen generator 10, 100 by a hydrogen permeable, liquid impermeable material 58. The hydrogen gas can exit the hydrogen generator 10, 100 through a hydrogen outlet connection 50. The hydrogen outlet connection 50 can be located near the distal portion of the effluent storage area 18 as shown in FIG. 10, or it can be located elsewhere, such as near the proximal portion of the effluent storage area 18 as shown in FIG. 9. If the hydrogen outlet connection 50 is not near the distal portion of the effluent storage area 18, the hydrogen gas can flow from the distal portion of the effluent storage area 18 to the hydrogen outlet connection 50 through a hydrogen outlet passage 48, such as a tube, which has a proximal end near the hydrogen outlet connection and a distal end 52 near the distal portion of the effluent storage area 18. The hydrogen gas can enter the hydrogen outlet passage 48 through the distal end 52. The hydrogen permeable, gas impermeable material 58 can be a component, such as a membrane, plug or filter element, preferably located at or near the distal end 52, or at least a portion of the hydrogen passage 48 can be made of a material that has high hydrogen permeability and low or no liquid permeability. If only a portion of the hydrogen passage 48 is made from a material with high hydrogen, low liquid permeability, that portion is preferably a distal portion to minimize the amount of solids in the effluent that comes in contact with and could clog the material, preventing hydrogen gas from exiting the effluent storage area 18.

If the hydrogen outlet connection 50 is located near the distal portion of the effluent storage area 18 as in FIG. 10, the hydrogen generator 10, 100 can include an optional compartment 60 positioned between the hydrogen outlet connection 50 and the hydrogen permeable, liquid impermeable material 58. Alternatively, at least a portion of an effluent storage area enclosure (e.g., a flexible bag) near the distal portion of the effluent storage area 18 can be the hydrogen permeable and liquid impermeable material.

As shown in FIGS. 9 and 10, the effluent storage area 18 can be in a volume exchanging relationship with both the reactant storage area 14 and the reaction area 16. As the hydrogen generator 10, 100 is used, reactant composition 20 is transported from the first reactant storage area 14, which becomes smaller, to the reactant area 16, where first and second reactants are consumed as they react to produce hydrogen and byproducts. The hydrogen gas and effluents exit the reaction area 16, which becomes smaller, and enter the effluent storage area 18, which is able to become larger by gaining at least a portion of the quantity of volume lost by the reactant storage area 14 and the reaction area 16. As the effluent storage area 18 becomes larger, the filter or at least one filter component 24, 26, 28 expands to partially or completely fill the enlarged volume and accommodate the hydrogen gas and effluent. The relative sizes, shapes and locations of the areas 14, 16, 18 can be varied as described above, as can passageways, connections and the like, as long as the effluent storage area 18 is in a volume exchanging relationship with at least one and preferably both of the reactant storage area 14 and the reaction area 16, and the filter 24, 26, 28 is initially compressed and expands during operation of the hydrogen generator as the volume of the effluent storage area 18 increases. The locations of other components, such as filter components, fluid connections, passageways, dispersing members, nozzles and the like can also be varied, whether the areas 14, 16, 18 are in the arrangement shown in FIG. 9 or FIG. 10 or in another arrangement.

The hydrogen generator 10, 100 can include an optional moveable partition 62, as shown in FIG. 10, between the effluent storage area 18 and adjacent portions of the reactant storage area 14 and the reaction area 16, with the moveable partition able to move toward the reactant storage area 14 and the reaction area 16 as those two areas 14, 16 become smaller and the effluent storage area 18 becomes larger during operation of the hydrogen generator 10, as long as there is a effluent entryway 46 through which effluent can pass into the effluent storage area 18. Such a moveable partition 62 can be used to facilitate compression of the filter components 24, 26, 28 during assembly of the hydrogen generator 10, 100. The hydrogen generator 10, 100 can include other components not shown in FIG. 9 or FIG. 10, as described above.

A variety of materials are suitable for use in a hydrogen generator, including those disclosed above. Materials selected should be resistant to attack by other components with which they may come in contact (such as reactant compositions, catalysts, effluent materials and hydrogen gas) as well as materials from the external environment. The materials and their important properties should also be stable over the expected temperature ranges during storage and use, and over the expected lifetime of the hydrogen generator.

Suitable materials for the housing and internal partitions can include metals, plastics, composites and others. Preferably the material is a rigid material that is able to tolerate expected internal pressures, such as a polycarbonate or a metal such as stainless steel or anodized aluminum. The housing can be a multi-component housing that is closed and sealed to securely hold the components of the hydrogen generator and prevent hydrogen gas from leaking therefrom. Various methods of closing and sealing can be used, including fasteners such as screws, rivets, etc., adhesives, hot melts, ultrasonic bonding, and combinations thereof.

Suitable materials for flexible enclosures can include polypropylene, polyethylene, polyethylene terephthalate and laminates with a layer of metal such as aluminum. If an elastic enclosure is desired, suitable materials include silicone and rubbers.

Suitable materials for tubing, etc., used to transport fluid reactant composition and effluents can include silicone, TYGON® and polytetrafluoroethylene.

Suitable materials for filters and filter components can include foam materials. A foam material can have an open cell structure (an open cell foam) or closed cell structure (a closed cell foam). Generally a major part of the foam filter will have an open cell structure. In some embodiments the filter component or a portion thereof can have a closed cell structure or a skin on one or more surfaces, depending on the desired porosity and permeability to solids, liquids and gases. The filter components can be made from elastomeric foams, preferable with a quick recovery (low compression set/high recovery). The elastomer may be a resilient cured, cross-linked or vulcanized elastomer, for example. Examples of suitable elastomeric materials include one or more of: a polyurethane elastomer, a polyethylene, a polychloroprene (neoprene), a polybutadiene, a chloro isobutylene isoprene, a chlorosulphonated polyethylene, an epichlorohydrin, an ethylene propylene, an ethylene propylene diene monomer, an ethylene vinyl acetate, a hydrogenated nitrile butadiene, a polyisoprene, an isoprene, an isoprene butylene, a butadiene acrylonitrile, a styrene butadiene, a fluoroelastomer, a silicone, and derivatives and combinations thereof.

Other materials that can be used for the filter components include reticulated materials such as reticulated polyesters (e.g., polyethylene terephthalate), polyethylene, polyurethane, polyimide, melamine, nylon, fiberglass, polyester wool and acrylic yarn. As disclosed above, the filter does not necessarily have to be made of a material that can expand by itself after being compressed if another means of expanding the filter is provided.

Suitable materials for a dispersing member can include a liquid impermeable material, such as tubular or other hollow components made from materials such as silicone rubber, TYGON® and polytetrafluoroethylene, polyvinylidene fluoride (PVDF) and fluorinated ethylene-propylene (FEP), with holes or slits formed therein; a liquid permeable member made from a material such as cotton, a nylon, an acrylic, a polyester, ePTFE, or a fitted glass that can allow the fluid reactant composition to pass through or that can wick the fluid reactant composition; or a combination, such as a hollow liquid impermeable material with holes or slits therein and wrapped in, surrounded by or coated with a material that can wick the fluid reactant composition.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A hydrogen generator comprising:
   a container;
   a first reactant storage area within the container, the first reactant storage area having a volume and configured to contain a fluid comprising a first reactant;
   a reaction area within the container, the reaction area having a volume;
   a fluid passage from the first reactant storage area to the reaction area;
   an effluent storage area within the container, the effluent storage area having a volume and configured to store hydrogen gas and an effluent produced by a reaction of the first reactant within the reaction area;
   an effluent passage from the reaction area to the effluent storage area;
   an initially compressed filter within the effluent storage area;
   a liquid impermeable, gas permeable component in fluid communication with the effluent storage area; and
   a hydrogen outlet;
   wherein:
      the initially compressed filter is configured to expand to contain a portion of the effluent, the effluent storage area volume is configured to increased, and at least one of the first reactant storage area volume and the reaction area volume is configured to decrease during operation of the hydrogen generator;
      a moveable partition separates the effluent storage area from at least one of the first reactant storage area and the reaction area;
      a portion of the filter is attached to the moveable partition; and
      the first reactant can react to produce hydrogen gas, and all of the hydrogen gas must pass through a portion of the effluent storage area to reach the hydrogen outlet.

2. The hydrogen generator according to claim 1, wherein the filter is configured to apply a force for reducing the first reactant storage area volume, the reaction area volume or both the first reactant storage area volume and the reaction area volume during operation of the hydrogen generator.

3. The hydrogen generator according to claim 2, wherein the hydrogen generator further comprises a biased component configured to apply a force for reducing the first reactant storage area volume, the reaction area volume or both the first reactant storage area volume and the reaction area volume during operation of the hydrogen generator.

4. The hydrogen generator according to claim 1, wherein the filter comprises at least two areas of different porosity prior to compression.

5. The hydrogen generator according to claim 4, wherein the filter comprises two distinct components, each having a different porosity prior to compression.

6. The hydrogen generator according to claim 4, wherein the area of greatest porosity prior to compression is closest to the effluent passage and the area of least porosity is closest to the outlet.

7. The hydrogen generator according to claim 1, wherein the filter comprises a material that does not have an affinity for a liquid in the effluent.

8. The hydrogen generator according to claim 7, wherein a portion of the filter proximate the effluent entryway to the effluent storage area does not have an affinity for the liquid in the effluent.

9. The hydrogen generator according to claim 1, wherein the filter comprises a material that has an affinity for a liquid in the effluent.

10. The hydrogen generator according to claim 9, wherein a portion of the filter proximate the liquid impermeable, gas permeable component has an affinity for the liquid in the effluent.

11. The hydrogen generator according to claim 1, wherein the filter comprises an open cell foam.

12. The hydrogen generator according to claim 1, wherein the moveable partition comprises a flexible effluent enclosure within the effluent storage area, the flexible effluent enclosure has a volume, and the filter is contained within and attached to a portion of the flexible effluent enclosure.

13. The hydrogen generator according to claim 12, wherein the moveable partition further comprises a rigid wall adjacent to the flexible effluent enclosure.

14. The hydrogen generator according to claim 12, wherein the volume of the flexible effluent enclosure is configured to increase during operation of the hydrogen generator.

15. The hydrogen generator according to claim 1, wherein the moveable partition pulls the filter to expand the filter.

16. The method according to claim 1, wherein the filter comprises an elastic material, and the filter expands as a result of a reduction in a compressive stress in the filter.

17. The hydrogen generator according to claim 1, wherein the first reactant is initially contained within a flexible first reactant enclosure within the first reactant storage area.

18. The hydrogen generator according to claim 1, wherein the hydrogen generator further comprises a second reactant.

19. The hydrogen generator according to claim 1, wherein at least one of the first reactant and the second reactant comprises a borohydride.

* * * * *